US007480828B2

(12) United States Patent
Jastad et al.

(10) Patent No.: US 7,480,828 B2
(45) Date of Patent: Jan. 20, 2009

(54) METHOD, APPARATUS AND PROGRAM STORAGE DEVICE FOR EXTENDING DISPERSION FRAME TECHNIQUE BEHAVIOR USING DYNAMIC RULE SETS

(75) Inventors: Michael A. Jastad, Portland, OR (US); Thomas G. Phelan, Beaverton, OR (US); Brent W. Yardley, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 10/865,206

(22) Filed: Jun. 10, 2004

(65) Prior Publication Data

US 2005/0278570 A1 Dec. 15, 2005

(51) Int. Cl.
*G06F 11/00* (2006.01)
(52) U.S. Cl. .............................. 714/39; 714/26; 714/49; 714/57
(58) Field of Classification Search .................... 714/26, 714/39, 45, 48, 49, 57
See application file for complete search history.

(56) References Cited

U.S. PATENT DOCUMENTS

| 5,664,093 | A | | 9/1997 | Barnett et al. |
|---|---|---|---|---|
| 5,727,144 | A | | 3/1998 | Brady et al. |
| 5,768,501 | A | * | 6/1998 | Lewis ........................... 714/48 |
| 5,828,830 | A | * | 10/1998 | Rangaraian et al. ............ 714/48 |
| 5,935,261 | A | | 8/1999 | Blachek et al. |
| 5,944,782 | A | | 8/1999 | Noble et al. |
| 6,310,911 | B1 | * | 10/2001 | Burke et al. .................. 375/224 |
| 6,336,065 | B1 | | 1/2002 | Gibson et al. |
| 6,553,403 | B1 | | 4/2003 | Jarriel et al. |
| 6,598,179 | B1 | * | 7/2003 | Chirashnya et al. ........... 714/37 |
| 6,760,391 | B1 | * | 7/2004 | Alb et al. ..................... 375/354 |
| 6,966,015 | B2 | * | 11/2005 | Steinberg et al. .............. 714/47 |
| 7,234,086 | B1 | * | 6/2007 | de Koos et al. ............. 714/704 |
| 2002/0010912 | A1 | | 1/2002 | Kasvand et al. |
| 2002/0124214 | A1 | | 9/2002 | Ahrens, Jr. et al. |
| 2002/0170002 | A1 | * | 11/2002 | Steinberg et al. .............. 714/39 |
| 2003/0084377 | A1 | | 5/2003 | Parks et al. |
| 2004/0073844 | A1 | * | 4/2004 | Unkle et al. .................. 714/39 |

FOREIGN PATENT DOCUMENTS

| JP | 10055320 A | 11/1997 |
|---|---|---|
| JP | 10187321 A | 7/1998 |
| TW | 556081 B | 10/2003 |
| TW | 579499 B | 3/2004 |

OTHER PUBLICATIONS

Lin et al., Error Log Analysis: Statistical Modeling and Heuristic Trend Analysis, IEEE Transactions on Reliability, vol. 39, No. 4, Oct. 1990, pp. 419-432.

* cited by examiner

*Primary Examiner*—Joshua A Lohn
(74) *Attorney, Agent, or Firm*—Lieberman & Brandsdorfer, LLC

(57) ABSTRACT

A method, apparatus and program storage device for providing control of statistical processing of error data over a multitude of sources using a dynamically modifiable DFT rule set is disclosed. The dispersion frame technique is extended in the present invention to provide dispersion frame rules with user-defined parameters thereby creating a dynamically modifiable rule set.

28 Claims, 5 Drawing Sheets

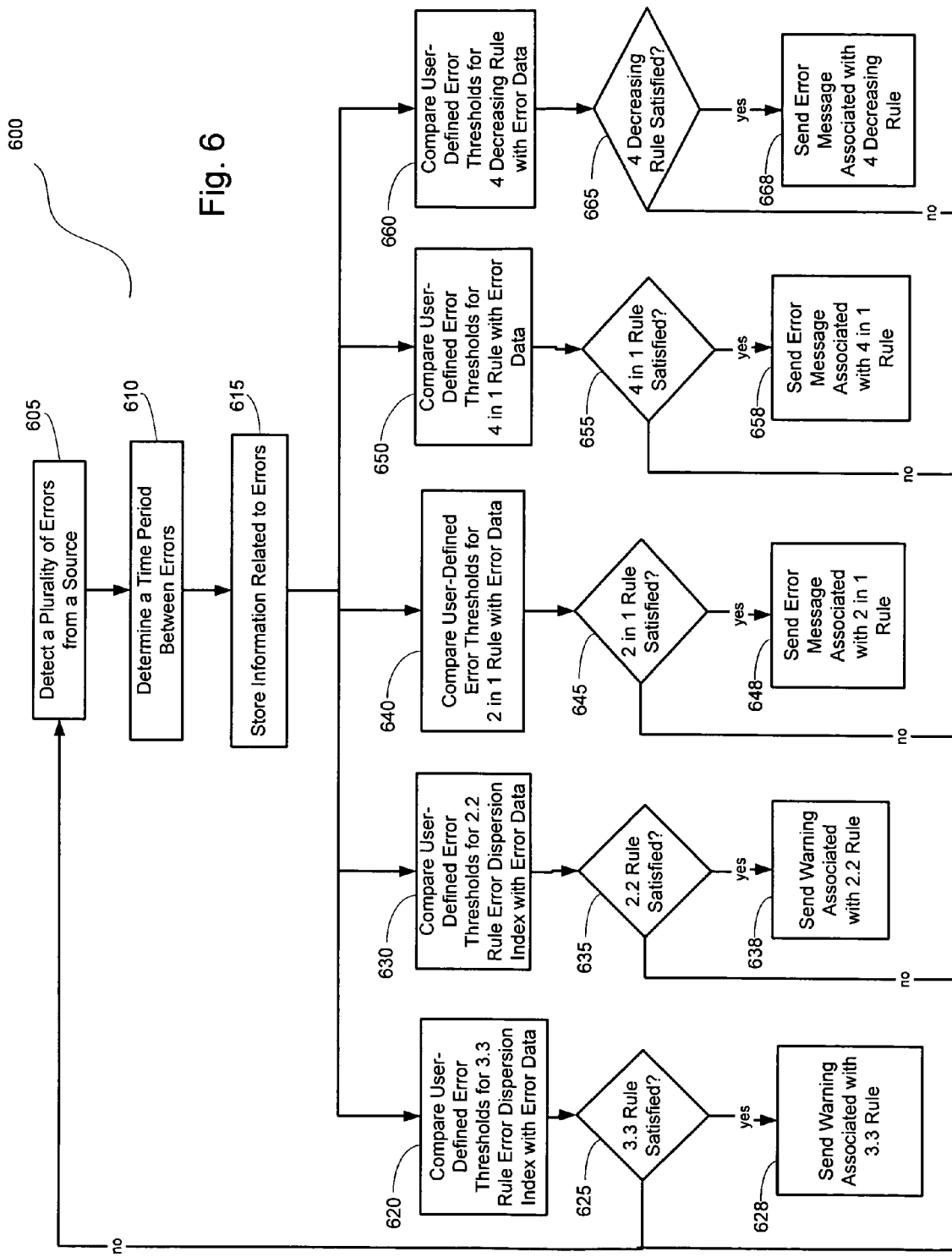

METHOD, APPARATUS AND PROGRAM STORAGE DEVICE FOR EXTENDING DISPERSION FRAME TECHNIQUE BEHAVIOR USING DYNAMIC RULE SETS

BACKGROUND OF THE INVENTION

1. Field of the Invention

This disclosure relates in general to processing error data, and more particularly to a method, apparatus and program storage device for providing control of statistical processing of error data over a multitude of sources using a dynamically modifiable DFT rule set.

2. Description of Related Art

As consumers become more dependent on computer systems to perform reliable tasks, tolerance for computer system errors decreases. Computer systems typically experience outages when soft failures occur. As hardware ages an increasing number of computer errors occur, and the likelihood of soft failure increases. Without safety mechanisms computer systems inevitably experience failure resulting in user dissatisfaction.

In order to avoid computer system failure, methods for predicting or diagnosing an impending system failure have been developed. For example, a specification-based diagnosis of system failure is a method for determining what the expected behavior of a system will be based on system design specifications under defined operating conditions. Tests based on expected system behavior are developed and used to diagnose system failure. The specification-based diagnosis approach, however, has limited abilities in isolating unanticipated faults and in developing tests for diagnosing unanticipated faults.

Another example of a mechanism for diagnosing system failure is the symptoms-based diagnosis. System fault conditions are identified symptomatically by reconstructing system failures using event or error logs to identify the circumstances where errors occurred and evaluating the circumstances surrounding the errors leading up to system failure. The symptoms-based diagnosis approach results in system failure indicators rather than tests like the specification-based diagnosis approach.

A particular example of a symptoms-based diagnosis technique is the dispersion frame technique (DFT) that was developed based on the observation that computer systems and other electronic devices experience an increasing error rate prior to catastrophic failure. The DFT technique uses rules to determine the relationship between error occurrences by examining their closeness in time and space. Extending DFT rules augments the functionality of a DFT engine and allows a tighter control of statistical processing of error data over a multitude of computer devices. The rules also allow significant increments in error rate occurring within a specified time frame to be viewed as a single error event. The single error event is only recognized if the increment exceeds a specified watermark defined by the rule. Methods using the DFT use rules that are static, however, and only provides a single dimension of statistical analysis.

It can be seen that there is a need for a method, apparatus and program storage device for providing and implementing a dynamically modifiable DFT rule set.

SUMMARY OF THE INVENTION

To overcome the limitations described above, and to overcome other limitations that will become apparent upon reading and understanding the present specification, the present invention discloses a method, apparatus and program storage device for providing control of statistical processing of error data over a multitude of sources using a dynamically modifiable DFT rule set.

The present invention solves the above-described problems by extending the dispersion frame technique to provide dispersion frame rules with user-defined parameters thereby creating a dynamically modifiable rule set to allow a DFT engine to work within varying ranges of data.

A method for providing error data processing having user-defined parameters includes applying user-defined error thresholds to a plurality of user-definable error threshold rules, processing error events, storing information related to the processed error events and determining when one of the plurality of user-definable error threshold rules has been satisfied based on the stored information.

In another embodiment of the present invention, a computing device for use in an error data processing system is provided. The computing device includes a memory for storing error information and a processor, coupled to the memory, for applying user defined error threshold data to a plurality of user-definable error threshold rules and determining when one of the plurality of user-definable error threshold rules has been satisfied based on the stored error information.

In another embodiment of the present invention, a method for providing error data processing having user-defined parameters is provided. The method includes applying user-defined error thresholds to a plurality of user-definable error threshold rules, detecting a plurality of errors from a source, calculating a time period between the plurality of errors, storing information related to the plurality of errors and the time periods between the plurality of errors and determining when one of the plurality of user-definable error threshold rules has been satisfied based on the stored information.

In another embodiment of the present invention, a computing device for use in an error data processing system is provided. The computing device includes a memory for storing error information, the error information related to error source and error interarrival time and a processor, coupled to the memory, for applying user defined error threshold data to a plurality of user-definable error threshold rules, determining when one of the plurality of user-definable error threshold rules has been satisfied based on the stored error source and error interarrival time.

In another embodiment of the present invention, a program storage device is provided. The program storage device includes program instructions executable by a processing device to perform operations for providing error data processing having user-defined parameters, the operations including applying user-defined error thresholds to a plurality of user-definable error threshold rules, processing error events, storing information related to the processed error events and determining when one of the plurality of user-definable error threshold rules has been satisfied based on the stored information.

In another embodiment of the present invention, a program storage device is provided. The program storage device includes program instructions executable by a processing device to perform operations for providing error data processing having user-defined parameters, the operations including applying user-defined error thresholds to a plurality of user-definable error threshold rules, detecting a plurality of errors from a source, calculating a time period between the plurality of errors, storing information related to the plurality of errors and the time periods between the plurality of errors and determining when one of the plurality of user-definable error threshold rules has been satisfied based on the stored information.

In another embodiment of the present invention, a computing device for use in an error data processing system is provided. The computing device includes means for storing error information and means, coupled to the means for storing, for applying user defined error threshold data to a plurality of user-definable error threshold rules and determining when one of the plurality of user-definable error threshold rules has been satisfied based on the stored error information.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 6 illustrates a flowchart of a method for processing errors according to an extended DFT rule set in accordance with embodiments of the invention.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

An embodiment of the present invention provides a method, apparatus and program storage device for providing control of statistical processing of error data over a multitude of sources using a dynamically modifiable DFT rule set. The dispersion frame technique is extended in the present invention to provide dispersion frame rules with user-defined parameters, creating a dynamically modifiable rule set.

Figure 1:
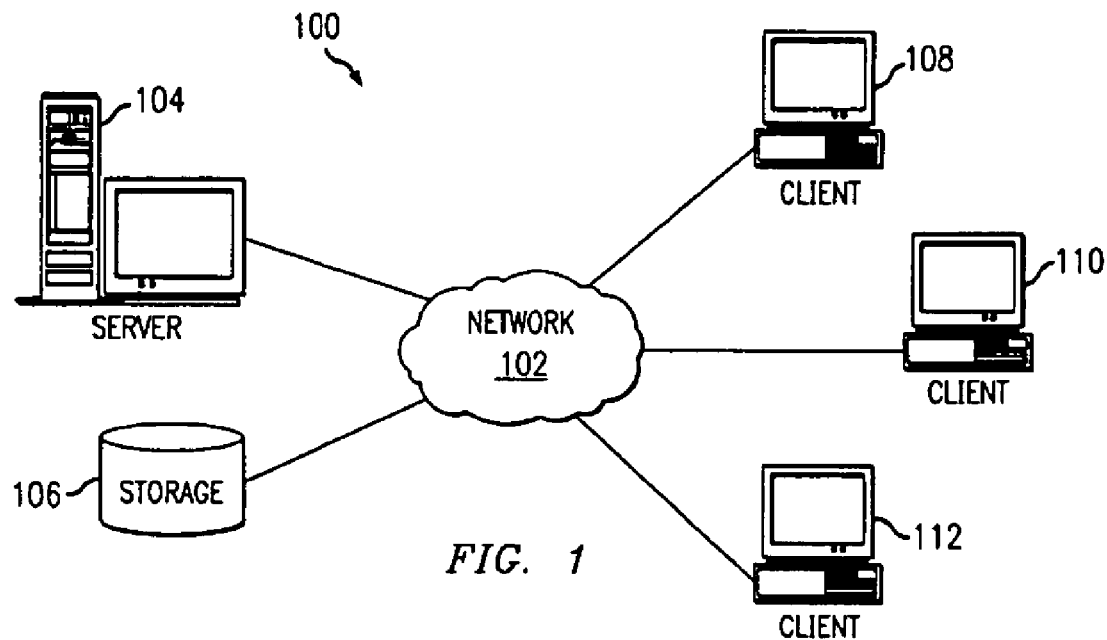
FIG. 1 shows a network of data processing system in which the present invention may be implemented.

FIG. 1 shows a network of data processing system 100 in which the present invention may be implemented. Network data processing system 100 includes a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers, network computers or workstations. In FIG. 1, server 104 provides data, such as boot files, operating system images, and applications to clients 108-112. Clients 108, 110, and 112 are clients to server 104. Network data processing system 100 may include additional servers, clients, and other devices not shown.

Figure 2:
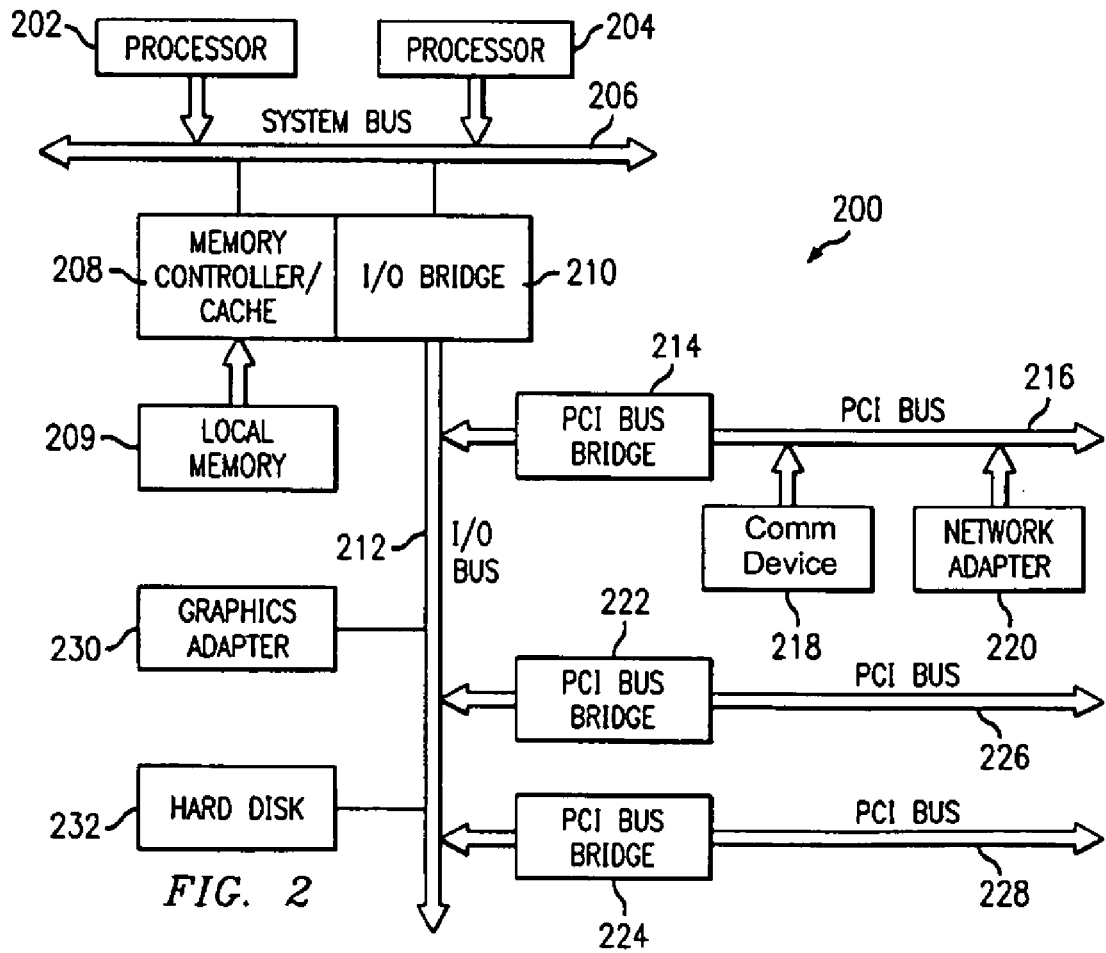
FIG. 2 is a block diagram of a computer processing system that may be implemented as a server or computer system as shown in FIG. 1.

FIG. 2 is a block diagram of a computer processing system 200 that may be implemented as a server or computer system as shown in FIG. 1. Computer processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of communication devices 218 may be connected to PCI local bus 216. Typical PCI bus implementations will support four PCI expansion slots or add-in connectors. Communications links to clients 108-112 in FIG. 1 may be provided through communication device 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, computer processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. Further, the types of buses may be different. The depicted example is not meant to imply architectural limitations with respect to embodiments of the present invention.

As described earlier, system fault conditions may be identified symptomatically by reconstructing system failures using event or error logs to identify the circumstances where errors occurred and evaluating the circumstances surrounding the errors leading up to system failure. The symptoms-based diagnosis approach results in system failure indicators rather than tests like the specification-based diagnosis approach. A particular example of a symptoms-based diagnosis technique is the dispersion frame technique (DFT) that was developed based on the observation that computer systems and other electronic devices experience an increasing error rate prior to catastrophic failure. The DFT technique uses rules to determine the relationship between error occurrences by examining their closeness in time and space. The DFT rule set is illustrated in Table 1 below.

TABLE 1

Dispersion Frame Rules

| | |
|---|---|
| 3.3 Rule | When two consecutive EDIs from successive application of the same dispersion frame exhibit an EDI of at least 3. |

TABLE 1-continued

Dispersion Frame Rules

| | |
|---|---|
| 2.2 Rule | When two consecutive EDIs from two successive dispersion frames exhibit an EDI of at least 2. |
| 2 in 1 Rule | When a dispersion frame is less than one hour. |
| 4 in 1 Rule | When four error events occur within a 24 hour frame. |
| 4 Decreasing Rule | When there are four monotonically decreasing dispersion frames and at least one frame is half the size of its previous frame. |

Methods using the DFT use rules that are static as shown in Table 1. However, static rules only provide a single dimension of statistical analysis. For example, as shown in Table 1, a typical dispersion frame technique (DFT) provides five statistical rules. Error dispersion indicies (EDIs) are the number of error occurrences in half of a dispersion frame. Dispersion frames are defined by interarrival times or the time between successive error events of the same type. A first rule covers when two consecutive Error dispersion indicies (EDIs) from successive applications of the same dispersion frame exhibit an EDI of at least 3 (3.3 Rule). A second rule covers when two consecutive EDIs from two successive dispersion frames exhibit an EDI of at least 2 (2.2 Rule). A third rule covers when a dispersion frame is less than one hour (2 in 1 Rule). A fourth rule covers when four error events occur within a 24-hour time frame (4 in 1 Rule). A fifth rule covers when there are four monotonically decreasing dispersion frames and at least one frame is half the size of its previous frame (4 Decreasing Rule). Accordingly, these rules may be used for determining the relationship between error occurrences by examining their type and closeness in time and space.

DFT utilizes a model based on the interarrival times of observations within a dispersion frame. Based on the experience gained in factoring error logs into individual error sources, the predictive failure analysis (PFA) engine extracts, organizes, and examines the error log entries from a persistent storage medium. The organization of the Rules applies one of its five failure prediction rules according to the interarrival patterns of the errors. The five rules capture behavior corresponding to that detected by traditional statistical analysis methods within a dispersion frame. The PFA engine determines the relationship between error occurrences by examining their closeness in time (duration) and space (affected area).

More particularly, the 3.3 Rule focuses on examining consecutive EDIs from the same dispersion frame. When successive applications of the dispersion frame yields an EDI of at least three a warning corresponding to the 3.3 Rule is sent. The 3.3 Rule has requirements of two consecutive EDIs, and an EDI of at least three. These requirements remain static in the DFT rule set.

The 2.2 Rule focuses on examining successive dispersion frames and the EDIs within the dispersion frames. When two dispersion frames have an EDI of at least two, the warning connected with the 2.2 Rule is sent. Similar to the 3.3 Rule, the 2.2 Rule has static requirements. Here the requirements are two consecutive EDIs in consecutive dispersion frames, and an EDI of at least two.

In the 2 in 1 and 4 in 1 Rule, focus is placed on the time span between error events. The 2 in 1 rule is satisfied when a dispersion frame, or the interarrival time between errors, spans a time of less than one hour. The 4 in 1 rule is satisfied when four error events occur within the span of one day. Each of the 2 in 1 and 4 in 1 Rules includes an unchanging time requirement and detected error requirement.

The 4 decreasing rule focuses on the time span between dispersion frames and the rate at which the errors are occurring. In the 4 decreasing rule a warning is sent after four dispersion frames are the same size or smaller than the previous dispersion frames and one of the frames is half the size of the previous dispersion frame. The 4 decreasing Rule includes static requirements of four dispersion frames be the same size or smaller than the previous dispersion frame and one dispersion frame be half the size of the previous dispersion frame.

Figure 3:
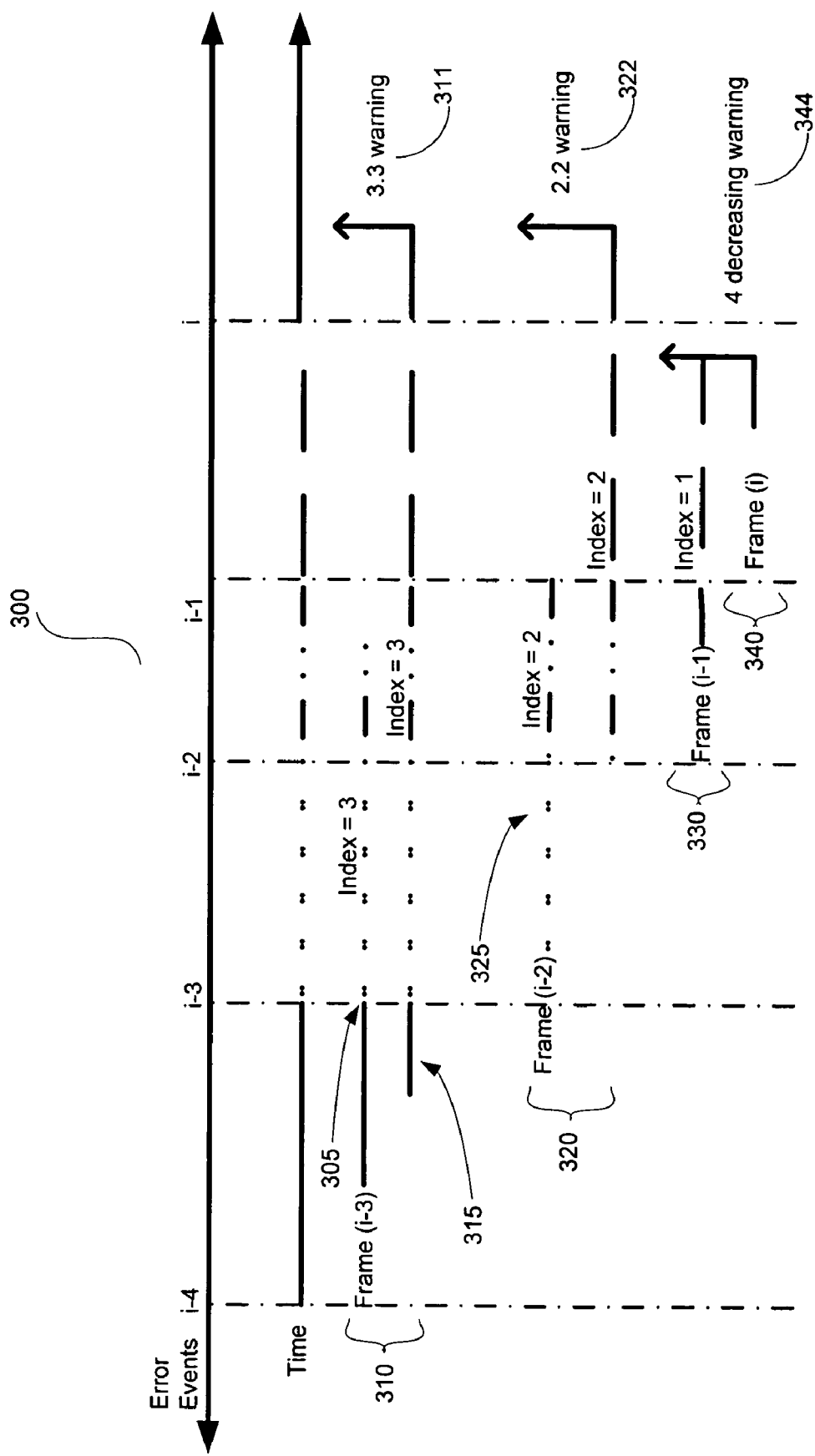
FIG. 3 is a graph that schematically illustrates error events on a timeline for illustrating implementation of an embodiment of the present invention.

FIG. 3 illustrates a graph 300 that schematically illustrates events on a timeline leading up to a 3.3 Rule warning, 2.2 Rule warning and a 4 Decreasing Rule warning. Error events i-4, i-3, i-2, i-1 and i are shown. A Dispersion Frame is defined as the interarrival time between successive error events of the same type. Thus, interarrival time is the time period between two error events. Dispersion Frame (i-3) 310 is the interarrival time between events i-4 and i-3. Frame (i-2) 320 is the dispersion frame between events i-3 and i-2.

The number of errors from the center to the right end of each frame is measured and designated as the Error Dispersion Index (EDI). An EDI for frame (i-3) 310 is 3, and frame (i-2) 320 is 2. An example of this would be frame (i-3) 310 is the time between errors i-3 and i-2.

With respect to the 3.3 Rule, in frame (i-3) 310 the EDI for two consecutive indicies 305 and 315 within applications of the same frame is three. The 3.3 Rule is satisfied by the time and space between error events requirements and the 3.3 Rule warning 311 is sent.

With respect to the 2.2 Rule, between frames (i-3) 310 and (i-2) 320, consecutive indicies have an EDI of at least two. The time span 315 next to Frame (i-2) of Frame (i-3) has an index of 3, and the time span 325 next to Frame (i-3) of Frame (i-2) has an index of 2. The time and space requirements for the 2.2 Rule are satisfied and a warning 322 corresponding to the 2.2 Rule is issued.

In viewing Frames (i-3) to (i), it can be seen that the four Frames (i-3) 310, (i-2) 320, (i-1) 330 and (i) 340 decrease or remain the same in size over time, and of the four frames, at least one frame (i) 340 is half the size of the previous frame (i-1) 330. Thus, the 4 Decreasing Rule 344 is satisfied. The above-mentioned DFT rules are static and only provide a single dimension of statistical analysis, however.

Figure 4:
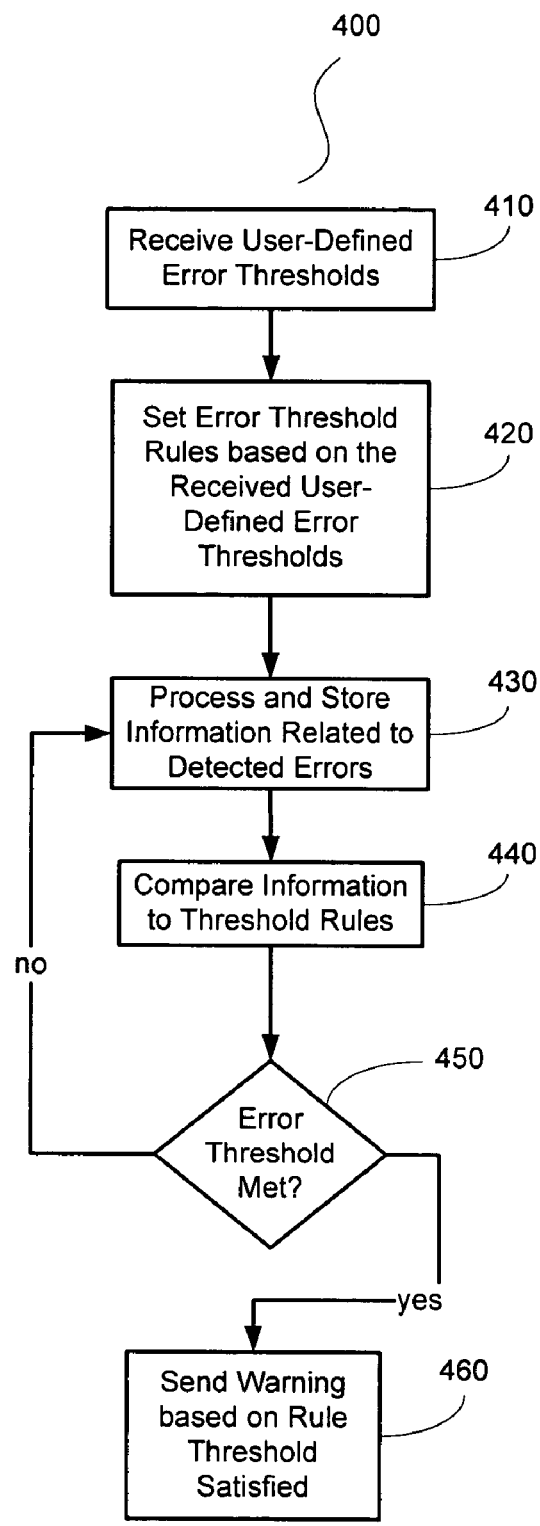
FIG. 4 is a flowchart of a method for error data processing in accordance with an embodiment of the present invention.

FIG. 4 is a flowchart 400 of providing a rule set having user-defined parameters for error data processing in accordance with embodiments of the present invention. User-defined error thresholds are received 410 and error threshold rules are set 420 according to the user-define error thresholds. Errors are detected and information related to the errors is stored 430. Stored information is compared 440 the threshold rules and a determination is made about whether an error threshold has been met 450. When an error threshold has not been met the engine driving the rule set continues to process and store 430 detected errors and compare 440 the stored information until an error threshold has been met. Once an error threshold has been reached a warning is sent 460.

The DFT rules described above are modified in embodiments of the present invention and assigned to devices having unique patterns. The user-defined rules are received as input to the extended DFT processing engine explained below. In accordance with embodiments of the invention, the extended DFT rule set is illustrated in Table 2.

TABLE 2

Extended Dispersion Frame Rules

| | |
|---|---|
| 3.3 Rule | When X consecutive EDIs from successive application of the same dispersion frame exhibit an EDI of at least Y. |
| 2.2 Rule | When X consecutive EDIs from two successive dispersion frames exhibit an EDI of at least Y. |
| 2 in 1 Rule | When a dispersion frame is less than N time frame. |
| 4 in 1 Rule | When four error events occur within N time frame. |
| 4 Decreasing Rule | When there are X monotonically decreasing dispersion frames and at least Y frame(s) is half the size of its previous frame. |

Similar to Table 1, error dispersion indicies (EDIs) are the number of error occurrences in half of a dispersion frame. Dispersion frames are defined by interarrival times between successive error events of the same type.

Figure 5:
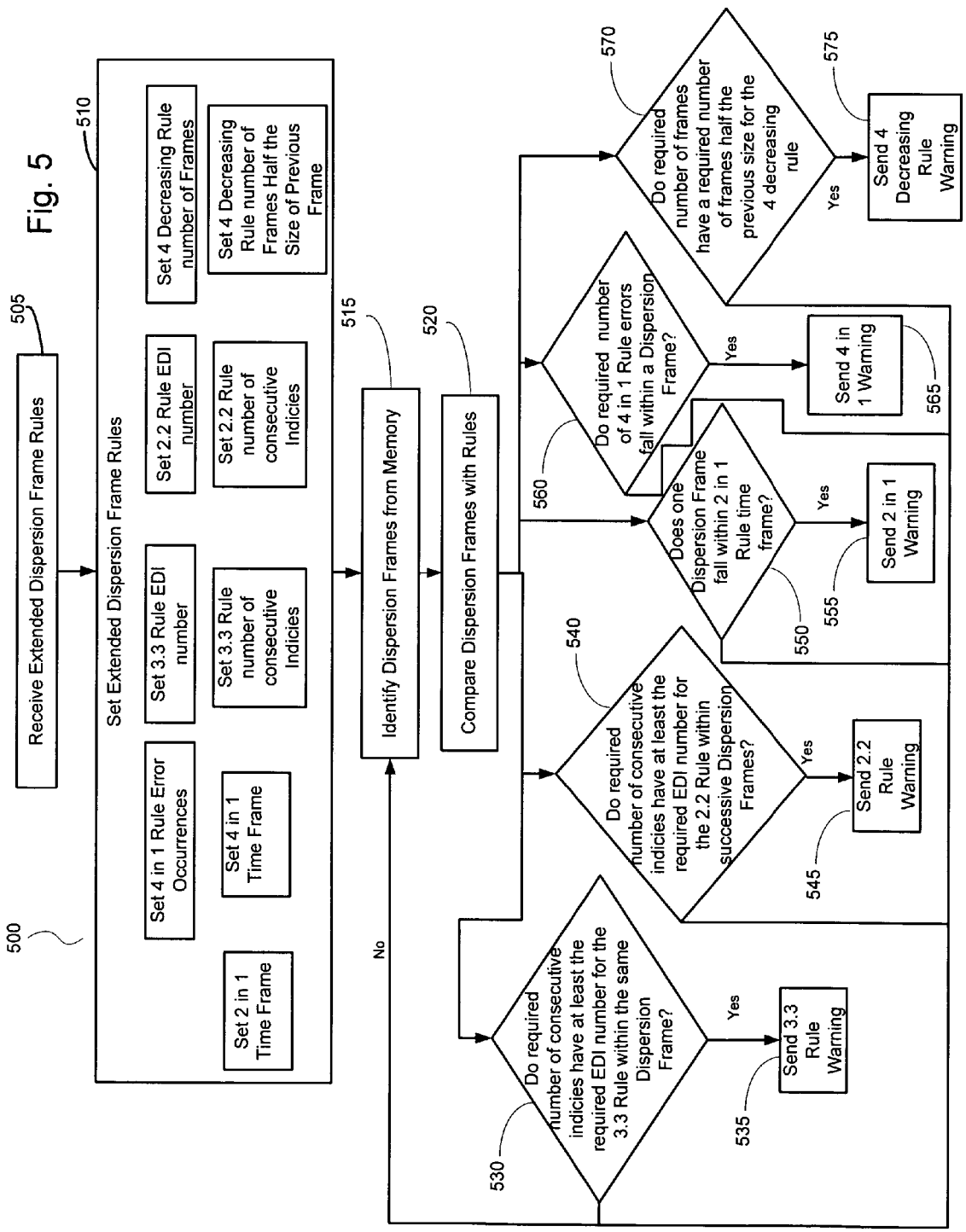
FIG. 5 is a flowchart of a method for providing an extended dispersion frame technique (DFT) rule set with user-defined parameters in accordance with an embodiment of the present invention.

FIG. 5 is a flowchart 500 illustrating providing an extended dispersion frame rule set with user-defined parameters in accordance with embodiments of the present invention. Extended dispersion frame rules are user-defined and received 505. Each variable is set 510 within the rule set. The variables include: the time frames for the 2 in 1 and 4 in 1 Rule, the number of required error occurrences for the 4 in 1 Rule, the required EDI number for the 3.3 and 2.2 Rule, the number of required consecutive indicies for the 3.3 and 2.2 Rule, the number of frames for the 4 Decreasing rule, and the number of frames required to be half the size of the previous frame for the 4 Decreasing Rule. Dispersion frames are identified 515 and compared with the extended dispersion frame rule set having user-defined parameters.

With respect to the 3.3 Rule, a comparison 520 is made between the 3.3 Rule requirements. When a user-defined number of EDIs from successive applications of the same dispersion frame have at least a user-defined EDI number, the threshold for the 3.3 Rule is satisfied 530 and a warning associated with satisfying the 3.3 Rule is sent 535.

For the 2.2 Rule, the plurality of errors are compared 520 to the 2.2 Rule requirements having user-defined parameters. When a user-defined number of consecutive EDIs from two successive frames exhibit at least a user-defined EDI number, the 2.2 Rule requirements are satisfied 540 and an associated 2.2 Rule warning is sent 545.

For the 2 in 1 Rule, the time frame between the plurality of errors is compared 520 with the user-defined 2 in 1 rule time frame. When errors are received within the defined time frame the 2 in 1 Rule is satisfied 550 and a 2 in 1 error message is sent 555.

For the 4 in 1 Rule, the time between a user-defined number of errors must fall within a user-defined time frame. When the stored error information is compared 520 with the 4 in 1 Rule user-defined requirements, and the requirements are met 560, a 4 in 1 error message is sent 565.

In a 4 Decreasing Rule scenario, a user-defined number of dispersion frames monotonically decreases and a user-defined number of the dispersion frames are half the size as the previous dispersion frame. The error data is compared 520 with the user-defined 4 Decreasing Rule, and when the 4 Decreasing Rule requirements are satisfied 570 an error message is sent 575 associated with the 4 Decreasing Rule.

In instances where the above-mentioned rules are not satisfied, the process cycles back to identifying 505 dispersion frames from memory until the rule requirements are met.

FIG. 6 illustrates a flowchart 600 of a method for processing errors according to an extended DFT rule set according to an embodiment of the present invention. A plurality of errors is detected 605 from a source. A time period between errors is determined 610 and information related to the errors is stored 615. Each of the extended DFT rules are compared 620, 630, 640, 650 and 660 with the stored error data. A determination is made whether the extended DFT rules are satisfied 625, 635, 645, 655 and 665. And for each of the extended DFT rules that are satisfied, a warning is sent 628, 638, 648, 658 and 668 associated with the particular rule satisfied. In instances where the rule set requirements are not met the process returns to the step where a plurality of errors is detected 605.

Referring again to FIG. 2, a suitable computing system environment 200 according to an embodiment of the present invention. For example, the environment 200 can be a client, a data server, and/or a master server that has been described. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200. In particular, the environment 200 is an example of a computerized device that can implement the servers, clients, or other nodes that have been described.

Computer storage media includes volatile, nonvolatile, removable, and non-removable media implemented in any method or technology for storage of information such as computer readable instructions, data structures, program modules, or other data. Memory 209, 208, storage, for example attached to PCI bus 226, 228 and/or hard drive 232 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by device 200. Any such computer storage media may be part of device 200.

Device 200 may also contain communications connection(s) 218 that allow the device to communicate with other devices. Communications connection(s) 218 is an example of communication media. Communication media typically embodies computer readable instructions, data structures, program modules, or other data in a modulated data signal such as a carrier wave or other transport mechanism and includes any information delivery media. The term "modulated data signal" means a signal that has at least one of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The methods that have been described can be computer-implemented on the device 200. A computer-implemented method is desirably realized at least in part as at least one programs running on a computer. The programs can be executed from a computer-readable medium such as a memory by a processor of a computer. The programs are desirably storable on a machine-readable medium, such as a floppy disk or a CD-ROM, for distribution and installation and execution on another computer. The program or programs can be a part of a computer system, a computer, or a computerized device.

In further embodiments of the invention the extended DFT rules allow significant increments in error rate occurring within a specified time frame, to be viewed as a single error event. The single error event is only recognized, however, if the increment exceeds a specified watermark defined by the rule.

Embodiments of the invention provide a convention to dynamically modify the extended DFT rules. This forces the DFT to work within varying ranges of data specified by the user. These varying ranges can also be applied to specific hardware elements that are being monitored and have the ability to report errors. Users of the extended DFT will have the flexibility to set tighter statistical constraints and tune the DFT engine to function across varying processing environments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing error data processing having user-defined parameters, comprising:
    applying user-defined error thresholds to a plurality of user-definable error threshold rules;
    processing error events of a same type, including detecting a plurality of errors from a source and calculating a time period between the plurality of errors;
    storing information related to the processed error events;
    determining when one of the plurality of user-definable error threshold rules has been satisfied based on the stored information, including determining that the detected plurality of errors satisfies a user-defined error dispersion index number, wherein the error dispersion index is the number of errors in half of the time period between errors of the same type; and
    reaching the user-defined error dispersion index number a user-defined number of times consecutively in the same time period between errors of the same type.

2. The method of claim 1, wherein the storing information related to the processed error events further comprises storing information related to the plurality of errors and the time periods between the plurality of errors.

3. The method of claim 1, wherein the determining when one of the plurality of user-definable error threshold rules has been satisfied further comprises comparing a number of detected errors and the time period between the plurality of errors to the user-definable error threshold rules.

4. The method of claim 1, further comprising reaching the user-defined error dispersion index number a user-defined number times consecutively in the same period of time between errors of the same type.

5. The method of claim 4 further comprising satisfying the user-defined error dispersion index number a user-defined number of times consecutively in two successive dispersion frames.

6. The method of claim 1, wherein the detecting the plurality of errors comprises processing errors occurring within a user-defined time frame and identifying the errors as one error when an error rate based on the calculated time period between the plurality of errors satisfies a user-definable error threshold rule.

7. The method of claim 1, further comprising sending a warning when one of the plurality of user-definable error threshold rules has been satisfied.

8. The method of claim 7, wherein the warning is of a particular type based on the one of the plurality of user-definable error threshold rules.

9. The method of claim 1, further comprising providing user-defined error thresholds for modifying the user-definable error threshold rules.

10. The method of claim 1, wherein determining when one of the plurality of user-definable error threshold rules has been satisfied based on the stored information comprises determining that the period of time between detected errors is less than a user-defined time frame.

11. The method of claim 1, wherein determining when one of the plurality of user-definable error threshold rules has been satisfied based on the stored information comprises determining that a user-defined number of detected errors occur within a user-defined time frame.

12. The method of claim 1, wherein determining when one of the plurality of user-definable error threshold rules has been satisfied based on the stored information comprises determining that a user-defined number of periods of time between errors occurs at a non-increasing rate.

13. The method of claim 12, wherein errors occurring at a non-increasing rate further comprises a user-defined number of errors occurring within half of the previous period of time between errors.

14. A method for providing error data processing having user-defined parameters, comprising:
    applying user-defined error thresholds to a plurality of user-definable error threshold rules;
    processing error events of a same type, including detecting a plurality of errors from a source and calculating a time period between the plurality of errors;
    storing information related to the processed error events; and
    determining when one of the plurality of user-definable error threshold rules has been satisfied based on the stored information, wherein the step of determining comprises determining that the detected plurality of errors satisfies a user-defined error dispersion index number, wherein the error dispersion index is the number of errors in half of the time period between errors of the same type.

15. The method of claim 14, wherein the step of storing information related to the processed error events further comprises storing information related to the plurality of errors and the time periods between the plurality of errors.

16. The method of claim 14, wherein the step of determining when one of the plurality of user-definable error threshold rules has been satisfied further comprises comparing a number of detected errors and the time period between the plurality of errors to the user-definable error threshold rules.

17. The method of claim 14, further comprising reaching the user-defined error dispersion index number a user-defined number times consecutively in the same period of time between errors of the same type.

18. The method of claim 17, further comprising satisfying the user-defined error dispersion index number a user-defined number of times consecutively in two successive dispersion frames.

19. The method of claim 14, wherein the step of detecting the plurality of errors comprises processing errors occurring within a user-defined time frame and identifying the errors on one error when an error rate based on the calculated time period between the plurality of errors satisfies a user-definable error threshold rule.

20. The method of claim 14, further comprising sending a warning when one of the plurality of user-definable error threshold rules has been satisfied.

21. The method of claim 20, wherein the step of warning is of a particular type based on the one of the plurality of user-definable error threshold rules.

22. The method of claim 14, further comprising providing user-defined error thresholds for modifying the user-definable error threshold rules.

23. The method of claim 14, wherein the step of determining when one of the plurality of user-definable error threshold rules has been satisfied based on the stored information comprises determining that the period of time between detected errors is less than a user-defined time frame.

24. The method of claim 14, wherein the step of determining when one of the plurality of user-definable error threshold rules has been satisfied based on the stored information comprises determining that a user-defined number of detected errors occur within a user-defined time frame.

25. The method of claim 14, wherein the step of determining when one of the plurality of user-definable error threshold rules has been satisfied based on the stored information comprises determining that a user-defined number of periods of time between errors occurs at a non-increasing rate.

26. The method of claim 25, wherein errors occurring at a non-increasing rate further comprises a user-defined number of errors occurring within half of the previous period of time between errors.

27. A method for providing error data processing having user-defined parameters, comprising:
  applying user-defined error thresholds to a plurality of user-definable error threshold rules;
  processing error events of a same type;
  storing information related to the processed error events; and
  determining when one of the plurality of user-definable error threshold rules has been satisfied based on the stored information, wherein the step of determining comprises determining that a user-defined number of periods of time between errors occurs at a non-increasing rate, and wherein errors occurring at a non-increasing rate further comprises a user-defined number of errors occurring within half of a previous period of time between errors.

28. A method for providing error data processing having user-defined parameters, comprising:
  applying user-defined error thresholds to a plurality of user-definable error threshold rules;
  processing error events of a same type, including detecting a plurality of errors from a source and calculating a time period between the plurality of errors;
  storing information related to the processed error events;
  determining when one of the plurality of user-definable error threshold rules has been satisfied based on the stored information, including determining that the detected plurality of errors satisfies a user-defined error dispersion index number, wherein the error dispersion index is the number of errors in half of the time period between errors of the same type;
  reaching the user-defined error dispersion index number a user-defined number of times consecutively in the same time period between errors of the same type; and
  satisfying the user defined error dispersion index number a user-defined number of times consecutively in two successive dispersion frames.

* * * * *